United States Patent [19]

Sheehy

[11] Patent Number: 4,947,390
[45] Date of Patent: Aug. 7, 1990

[54] METHOD FOR DATA TRANSFER THROUGH A BRIDGE TO A NETWORK REQUIRING SOURCE ROUTE INFORMATION

[75] Inventor: David B. Sheehy, Roseville, Calif.

[73] Assignee: Hewlett-Packard Company, Palo Alto, Calif.

[21] Appl. No.: 327,202

[22] Filed: Mar. 22, 1989

[51] Int. Cl.$^5$ .............................................. H04J 3/24
[52] U.S. Cl. ............................... 370/85.13; 370/85.12
[58] Field of Search ................. 370/85.13, 85.14, 94.1, 370/85.12; 340/825.5, 825.51

[56] References Cited

U.S. PATENT DOCUMENTS

| Re. 31,852 | 3/1985 | Soderblom | 370/85.5 |
|---|---|---|---|
| 4,287,592 | 9/1981 | Paulish et al. | 370/85.14 |
| 4,587,651 | 5/1986 | Nelson et al. | 370/85.13 |
| 4,706,081 | 11/1987 | Hart et al. | 370/85.13 |
| 4,737,953 | 4/1988 | Koch et al. | 370/85.13 |

OTHER PUBLICATIONS

"Draft Addendum to ANSI/IEEE Std 802.5-1988 Token Ring MAC & PHY Specification Enhancement for Multiple-Ring Networks", prepared by the IEEE 802.5 Rapporteur on Multiple-Ring Networks IEEE, Inc., Dec. 9, 1988, pp. 1-25.

*Primary Examiner*—Douglas W. Olms
*Assistant Examiner*—Min Jung

[57] ABSTRACT

A method for handling data frames (71,81) by a bridge (51) between a first network (61) which does not require route information within data frames (71,81) and a second network (21,22,23,24,25) requiring route information (74) within data frames (71,81) is presented. A system memory (12) includes an address table (14,140,141). In the address table (14,140,141) are a plurality of entries. Each entry is for a single station (31-60) on the first network (61) or the second network (21,22,23,24,25). Each entry contains a first field (17,170,171) which is the address of the station (31-60) and when the station (31-60) is in the second network (21,22,23,24,25) the entry additionally includes a second field (19,191) which contains a route to the station (31-60). When a first data frame (81) having a first destination address (72) is received from the first network (61), the address table (14,140,141) is checked for an entry which has the first destination address (81) in the first field (17,170,171). If an entry is found indicating that the first destination address (81) is for a station (31-54) in the second network (21,22,23,24,25), the route information (74) in the second field (19,191) is added to the first data frame (81) to create a first modified data frame and the first modified data frame is sent out on the second network (21,22,23,24,25). If no entry is found for the first destination address (81) a route discovery process is initiated to discover a route to the station (31-54) on the second network (21,22,23,24,25) with the first destination address (81).

13 Claims, 3 Drawing Sheets

METHOD FOR DATA TRANSFER THROUGH A BRIDGE TO A NETWORK REQUIRING SOURCE ROUTE INFORMATION

BACKGROUND

The present invention concerns the transfer of data from a first network which transfers data arranged in frames within which are not included source routing information, through a bridge, to a second network which requires frames to include source routing information.

For data transfer in some networks it is required that source route data be included with data frames. For instance, networks which are designed according to Draft Addendum to ANSI/IEEE Standard 802.5-1988 Token Ring MAC & PHY Specification Enhancement for Multiple-Ring Networks; Dec. 9, 1988, Prepared by the IEEE 802.5 Rapporteur on Multiple-Ring Networks; Institute of Electrical and Electronic Engineers, Inc., will be required to include source route data with each frame. This addendum to ANSI/IEEE Standard 802.5-1988 provides for a plurality of ring networks to be joined together by bridges. The source route data may contain a specific route through the network. Particularly, the source route data may contain a series of routing designators indicating which network rings and bridges the data frame is to travel through.

Alternately, the source route data may indicate that an explorer route is to be taken. Explorer routes are taken in order to discover a route from a source to a destination station. There are two types of explorer routes. The first type of explorer route is a spanning-tree route. Frames sent with a spanning tree route are relayed only by bridges designated as spanning tree bridges. These spanning tree bridges are chosen such that frames sent on a spanning tree route will appear once and only once on every network ring. Spanning tree routes are used by a source initiating a route discovery process.

The second type of explorer route is an all-paths route. A data frame with an all-paths route will be routed from along every non-repeating route in the network which is from the source of the data frame to the destination of the data frame. An all-paths route will be sent in response to route discovery frame on a spanning-tree route. The destination station of an all-paths route will receive as many frames as there are different routes from the source station to the destination station.

SUMMARY OF THE INVENTION

In accordance with the preferred embodiment of the present invention a method for handling data frames by a bridge between a first network which does not require route information within data frames and a second network requiring route information within data frames is presented. The bridge includes a first memory, a system processor and a system memory. The first memory receives data frames from the first network and from the second network, the data frames each have a destination address. The system memory includes an address table. In the address table are a plurality of entries. Each entry is for a single station on the first network or the second network. Each entry contains a first field which is the address of the station and when the station is in the second network the entry additionally includes a second field which contains a route to the station.

When a first data frame having a first destination address is received by the first memory from the first network, the system processor checks the address table for an entry which has the destination address in the first field. If an entry is found indicating that the destination address is for a station in the second network, first route information in the second field is added to the first data frame to create a first modified data frame and the first modified data frame is sent out on the second network. If no entry is found for the destination address a route discovery process is initiated to discover a route to the station on the second network with the destination address.

When a second data frame having second route information is received by the first memory from the second network, the system processor checks to see whether the bridge is included in the second route information. If the second route information includes the bridge, the route information in the second data frame is removed from the first data frame to create a second modified data frame and the second modified data frame is sent out on the first network. If no entry is found for a source address contained in the second data frame, an entry is added to the address table with the source address in the first field and route information which is derived from the route information in the second data frame is placed in the second field.

DESCRIPTION OF THE PREFERRED EMBODIMENT

Figure 1:
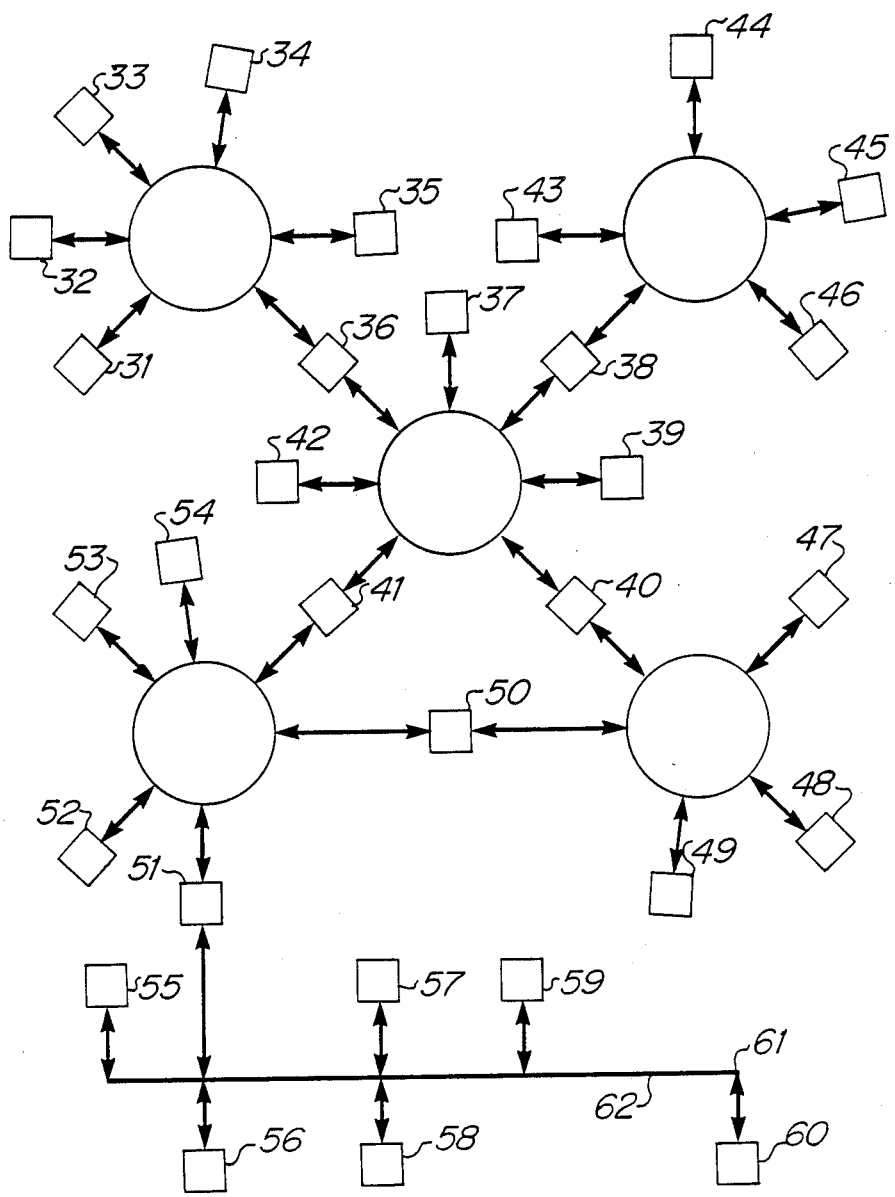
FIG. 1 shows bus network joined through a bridge to a multiple ring network in accordance with the preferred embodiment of the present invention.

FIG. 1 shows a block diagram of a multiple ring network. A network ring 21 consists of a station 31, a station 32, a station 33, a station 34, a station 35 and a station 36 joined together as shown. A network ring 22 consists of station 36, a station 37, a station 38, a station 39, a station 40, a station 41 and a station 42 joined together as shown. A network ring 23 consists of station 38, a station 43, a station 44, a station 45, and a station 46 joined together as shown. A network ring 24 consists of station 40, a station 47, a station 48, a station 49 and a station 50 joined together as shown. A network ring 25 consists of station 41, station 50, a station 51, a station 52, a station 53 and a station 54 joined together as shown.

Various stations function as bridges between the network rings. For example, station 36 functions as a bridge between network ring 21 and network ring 22. Station 38 functions as a bridge between network ring 22 and network ring 23. Station 40 functions as a bridge between network ring 23 and network ring 24. Station 41 functions as a bridge between network ring 23 and network ring 25. Station 50 functions as a bridge between network ring 24 and network ring 25.

Also shown in FIG. 1 is a bus network 61 consisting of a bus 62 to which is connected station 51, a station 55, a station 56, a station 57, a station 58, a station 59 and a station 60. The bus network may be, for example, a network designed according to ANSI/IEEE Standard 802.3. Station 51 functions as a bridge between network ring 25 and the bus network.

Figure 2:
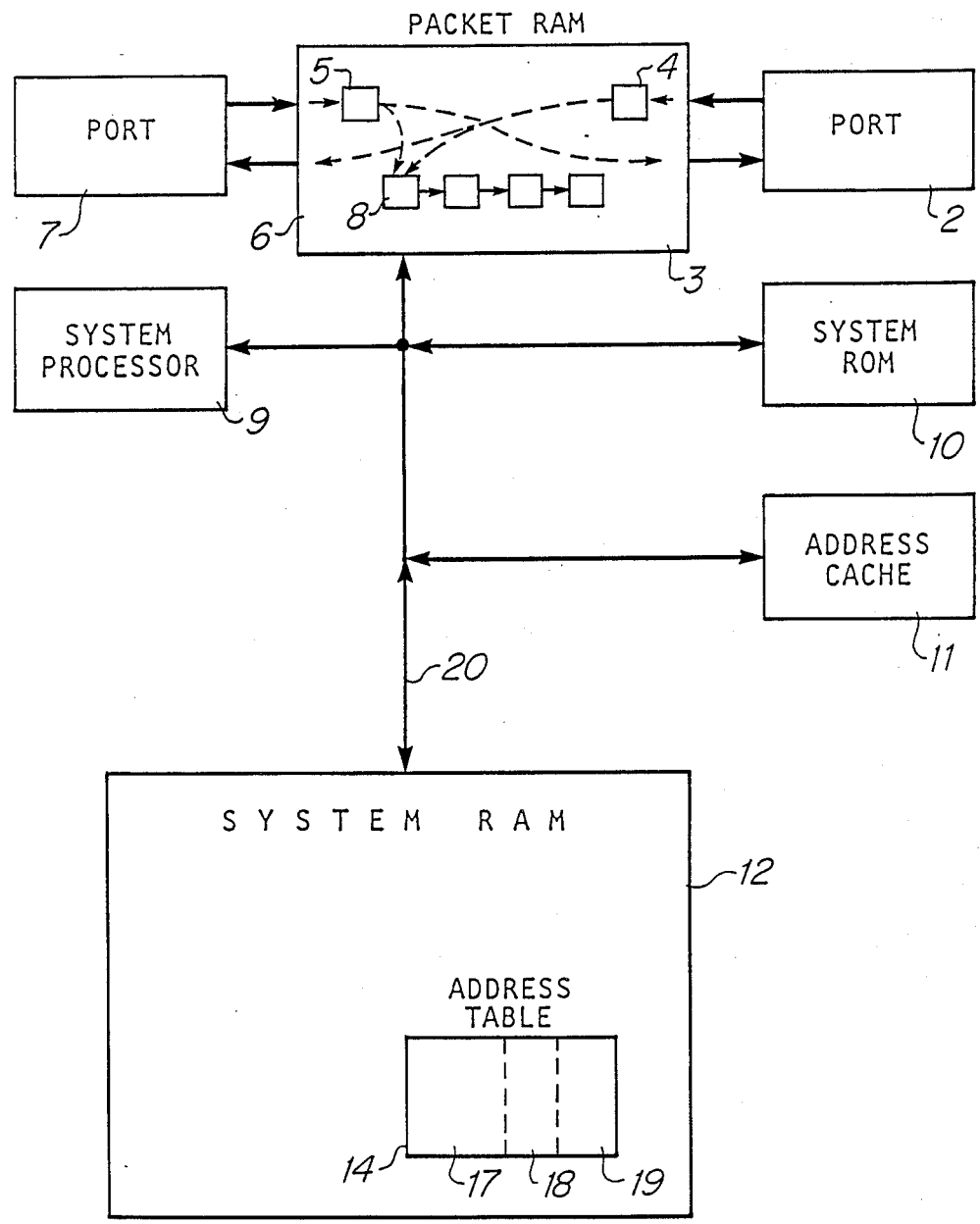
FIG. 2 shows a block diagram of the bridge joining the bus network and the multiple ring network in accordance with the preferred embodiment of the present invention.

FIG. 2 shows a block diagram of station 51. Data frames from network ring 25 are received by and sent from a packet random access memory (RAM) 3 via a port 1. Data frames from the bus network are received by and sent from packet RAM 3 via a port 2.

A system processor 9 monitors data frames received by packet RAM 3. For example a data frame received from port 1 is loaded into a packet buffer 5. System processor 9 may modify the data frame and direct packet RAM 3 to send the modified data frame to port 2. Alternately, system processor 9 may direct packet RAM 3 to throw away the data frame by attaching packet buffer 5 to unused packet buffers 8.

Similarly, a data frame received from port 2 is loaded into a packet buffer 4. System processor 9 may modify the data frame and direct packet RAM 3 to send the modified data frame to port 1. Alternately, system processor 9 may direct packet RAM 3 to throw away the data frame by attaching packet buffer 4 to unused packet buffers 8.

System processor 9, through a bus 20, accesses a system read-only memory (ROM) 10, an address cache 11 and a system RAM 12. System ROM includes program code executed by system processor 9. An address table 14 within RAM 12 includes an address column 17, a port number column 18 and a route column 19. Each entry in address table 14 will have an address in column 1, and an associated port number in column 2. The port number indicates the port through which messages need to be sent in order to get to the station bearing the address. An entry whose port number in column 2 indicates "Port 1" will contain a route in column 3 to the station which has the address in column 1. Address table 14 has an entry for every station on the bus network known by station 51 to be active. Address table 14 also has an entry for every station in the multiple ring network for which station 51 has a route to that station.

Figure 4:
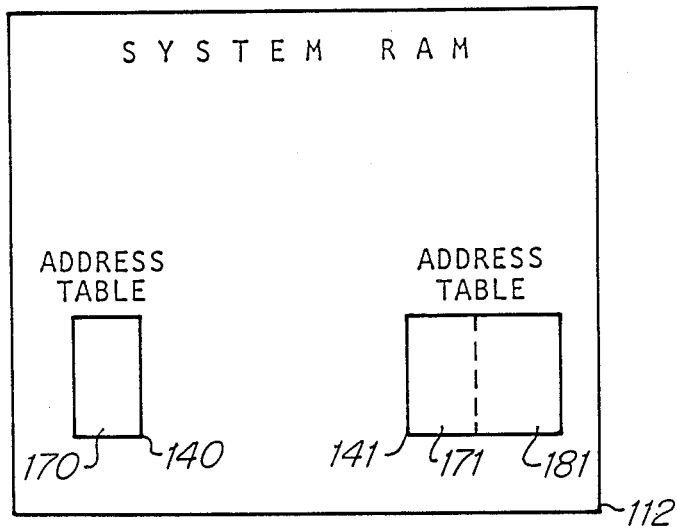
FIG. 4 shows an alternate embodiment of an address table shown in FIG. 2.

An alternate embodiment to address table 14 is shown in FIG. 4. In FIG. 4, in an address table 140 a column 170 contains addresses of all stations on bus network 61 known by station 51 to be active. In an address table 141 is an entry for every station in the multiple ring network for which station 51 has a route to that station. Each entry for a station consists of an address of the station in a column 171, and a route to the station in a column 181.

Figure 3:
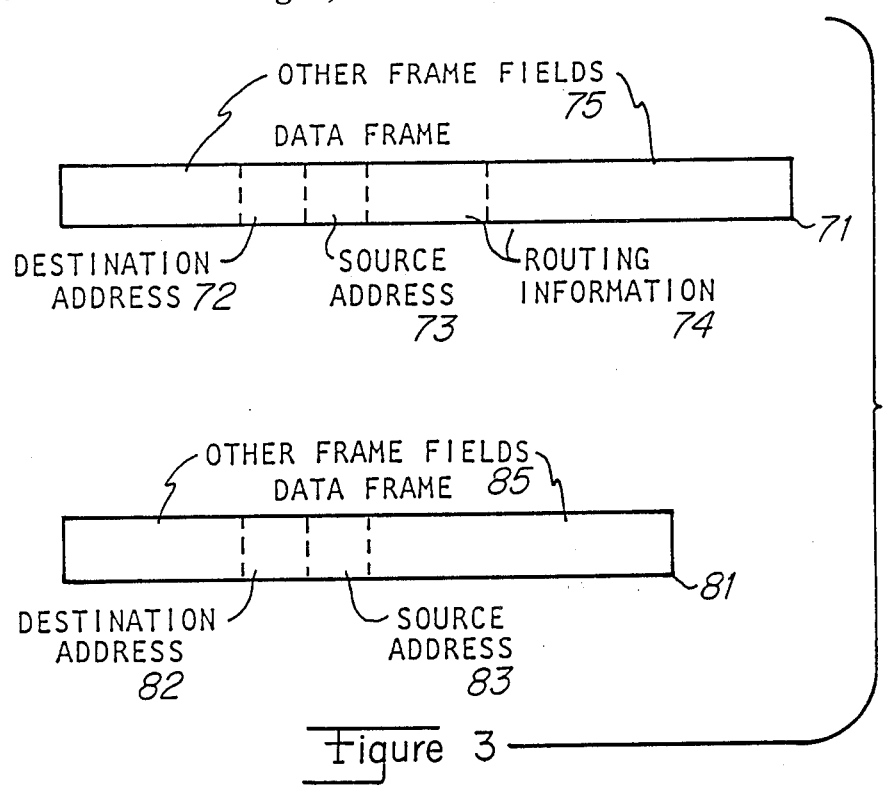
FIG. 3 shows the organization of a data frame used in the multiple ring network shown in FIG. 1 and the organization of a data frame used in the bus network also shown in FIG. 1.

FIG. 3 shows data frame organization for a data frame 75 used in the multiple ring network and data frame organization for a data frame 81 used in the bus network. Data frame 75 is shown to include a destination address 72, a source address 73, routing information 74 and other frame fields 75. Data frame 85 is shown to include a destination address 82, a source address 83 and other frame fields 85.

As may be seen from FIG. 3, data frame 71 has a field 74 which contains routing information. Data frame 81 has no such routing information. Therefore, when system processor 9 modifies data frames from port 2 to send out on port 1, system processor 9 needs to supply routing to the modified frame.

When Packet RAM 3 receives a first data frame with a first destination address from port 2, system processor 9 will compare the first destination address of the first data frame with the entries in address cache 11. If the first destination address matches an entry in address cache 11, that indicates the address is listed in an address table 14 in system RAM 12. System processor 9 will examine the entry with the destination address in column 1. If the port number for the entry is for "Port 2", system processor 9 will instruct Packet RAM 3 to discard the first data frame. There is no need to forward such a data frame since the data frame is already on the correct network. If the port number for the entry is for "Port 1" system processor 9 will add the route in column 3 to the first data frame. Additionally, system processor 9 will make any other necessary changes to the first data frame to conform the data frame to the format of data frame 71. Then system processor 9 will direct Packet RAM 3 to send the modified data frame out on port 1.

If the first destination address does not match an entry in address cache 11, that indicates that the destination station of the first data frame is not known to reside on the bus network and indicates that there is no known route from station 51 to the destination station. System processor 9, therefore, will direct Packet RAM 3 to discard the first data frame. System processor 9 will also construct a new data frame to be sent out on port 1. This new data frame will initiate a route discover process to the station with the first destination address. When packet RAM 3 receives data frames on port 1 in response to the route discover process, these will contain a route to the first destination address. System processor 9 will add the first destination address to address cache 11 and will add an entry to address table 14 which includes the first destination address, and a route to the first destination address. Therefore, the next time packet RAM 3 receives a data frame on port 2 with the first destination address, the packet will be modified and forwarded to port 1 for being sent out on the multiple ring network.

When Packet RAM 3 receives a second data frame with a second destination address from port 1, system processor 9 will examine route information with the second data frame to determine the type of the message. If the message contains an explorer route of the type "all paths route" then system processor 9 will compare the second destination address of the second data frame with the entries in address cache 11. If the second destination address matches an entry in address cache 11, that indicates the address is listed in an address table 14 in system RAM 12. System processor 9 will examine the entry with the destination address in column 1. If the port number for the entry is for "Port 1", system processor 9 will discard the second data frame without forwarding the message to bus network 61. All other cases will be handled by system processor 9 in accordance with the protocol of network ring 25. Additionally, system processor 9 will throw away messages with an explorer route of the type "all-paths route" without forwarding the message to bus network 61.

If the routing information includes station 51 as a bridge, system processor 9 will remove the route information from the second data frame. Additionally, system processor 9 will make any other necessary changes to the second data frame to conform the data frame to the format of data frame 81. Then system processor 9 will direct Packet RAM 3 to send the modified data frame out on port 2. Additionally, if there is no entry for the source address in the address cache, system processor 9 will add the source address to address cache 11 and will add an entry to address table 14 which includes the source address, and a route to the source address derived from the route information included in the second data frame. When there is an entry for the source address in the address cache, system processor 9 may elect to update the listed route with the route information included in the second data frame. However, address table 14 never contains more than one entry for each address.

I claim:

1. A method for handling data frames (71,81) by a bridge (51) between a first network (61) which does not require route information within data frames (81) and a second network (21,22,23,24,25) requiring route information (74) within data frames (71), the method comprising the steps of:
   (a) receiving a first data frame (81) from the first network (61), the first data frame (81) having a first destination address (72);
   (b) when the first destination address (72) addresses a station (31-54) on the second network (21,22,23,24,25) and the bridge (51) has route information (74) to the station (31-54) on the second network (21,22,23,24,25), performing the following substeps:
       (b1) adding first route information (74) to the first data frame (81) to create a first modified data frame, and
       (b2) sending the first modified data frame out on the second network (21,22,23,24,25); and,
   (c) when the first destination address (72) addresses a station (31-54) on the second network (21,22,23,24,25) and the bridge (51) does not have route information (74) to the station (31-54) on the second network (21,22,23,24,25), initiating a route discovery process to discover a route to the station (31-54) on the second network (21,22,23,24,25).

2. A method as in claim 1 additionally comprising the step of:
   (d) maintaining an address table (14,140,141) which includes the addresses for stations (51,55-60) on the first network (61) and which includes addresses and route information (74) of stations (31-54) on the second network (21,22,23,24,25) for which stations (31-54) on the second network (21,22,23,24,25) for which route information (74) is known by the bridge (51).

3. A method as in claim 2 additionally comprising the step of:
   (e) receiving a second data frame (71) from the second network (21,22,23,24,25), the second data frame (71) having a second destination address (72) and a source address (73); and,
   (f) when the bridge (51) is referenced in the second route information (74), performing the following substeps:
       (f1) removing route information (74) from the second data frame (71) to create a second modified data frame, and
       (f2) sending the second modified data frame out on the first network (61), and
       (f3) when the source address (73) is not in the address table (14,140,141) creating an entry in the address table (14,140,141) which includes the source address (73) and route information (74) derived from the route information (74) in the second data frame (71).

4. A method as in claim 2 additionally comprising:
   (e) maintaining an address cache (11) in which is stored an address for every entry in the address table (14,140,141).

5. A method as in claim 1 wherein step (c) additionally includes discarding the first data frame (81) when the first destination address (72) addresses a station (31-54) on the second network (21,22,23,24,25) and the bridge (51) does not have route information (74) to the station (31-54) on the second network (21,22,23,24,25).

6. A bridge (51) between a first network (61) which does not require route information within data frames (71,81) and a second network (21,22,23,24,25) requiring route information (74) within data frames (71,81), the bridge (51) comprising:
   a first memory (3) which receives data frames (71,81) from the first network (61) and from the second network (21,22,23,24,25), the data frames (71,81) each having a destination address (72,82);
   a system processor (9), coupled to the first memory (3), the system processor (9) monitoring data frames (71,81) received by the first memory (3); and,
   a system memory (12), coupled to the system processor (9), the system memory (12) including an address table (14,140,141), the address table (14,140,141) including a plurality of entries, each entry being for a single station (31-60) and each entry including a first field (17,170,171) containing an address of the station (31-60), and when the station (31-60) is in the second network (21,22,23,24,25) the entry includes a second field (19,191) which contains a route to the station (31-60);
   wherein when the first memory (3) receives from the first network (61) a first data frame (81) having a first destination address (72), the system processor (9) searches the address table (14,140,141) for the first destination address (72),
   the system processor (9) adding first route information (74) to the first data frame (81) to form a first modified data frame and sending the first modified data frame out on the second network (21,22,23,24,25) when the system processor (9) finds a second entry in the address table (14,140,141), the second entry including the first destination address (72) in a first field (17,170,171) of the second entry, and the first destination address (72) being address of a station (31-54) on the second network (21,22,23,24,25), and
   the system processor (9) initiating a route discovery process to a station (31-54) on the second network (21,22,23,24,25) with the first destination address (72) when no entry in the address table (14,140,141) contains the first destination address (72).

7. A bridge (51) as in claim 6 wherein when the first memory (3) receives from the second network (21,22,23,24,25) a second data frame (71) having second route information (74) and a source address (73), the system processor (9) searches the second route information to determine whether the bridge (51) is in the second route information (74),
   the system processor (9) removing the second route information (74) from the second data frame (71) to form a second modified data frame and sending the second modified data frame out on the first network (61) when the system processor (9) determines the bridge (51) is referenced in the second route information (74), and the system processor (9) adding a third entry to the address table (14,140,141), the third entry having the source address in a first field (17,170,171) address, and a second field (19,191) having route information (74) derived from the second route information (74) when the second destination address (72) is the address of a station (51,55-60) on the first network (61) and no entry in the address table (14,140,141) contains the the source address.

8. A bridge (51) as in claim 6 additionally comprising an address cache (11), coupled to the system processor (9), the address cache (11) containing at least a portion of addresses contained in the first field (17,170,171) of entries in the address table (14,140,141).

9. A bridge (51) as in claim 6 wherein the system processor (9) discards the first data frame (81) when the system processor (9) finds a first entry in the address table (14,140,141) which includes the first destination address (72), the first destination address (72) being the address of a station (51,55-60) on the first network (61).

10. A bridge (51) as in claim 6, each entry in the address table (14,140,141) including a third field (18) indicating in which of the first network (61) and the second network (21,22,23,24,25) a station (31-60) listed in the first field (17,170,171) of the entry resides.

11. A bridge (51) as in claim 6 wherein when the first memory (3) receives from the second network (21,22,23,24,25) a second data frame (71) having second route information (74), a second destination address (72) and a source address (73), the system processor (9) searches the second route information (74) to determine whether the second data frame (71) is an explorer message of the all routes type and searches the address table (14,140,141) to determine on which network (21,22,23,24,25,61) a station (31-60) with the second destination address (72) resides, the system processor (9) discarding the second data frame (71) when both the second data frame (71) is an explorer message of the all routes type and the second destination address (72) addresses a station (31-54) on the second network (61).

12. A method for handling data frames (71,81) by a bridge (51) between a first network (61) which does not require route information within data frames (71,81) and a second network (21,22,23,24,25) requiring route information (74) within data frames (71,81), the method comprising the steps of:

(a) receiving a first data frame (81) from the first network (61), the first data frame (81) having a first destination address (72);

(b) when the first destination address (72) addresses a station (31-54) on the second network (21,22,23,24,25) and the bridge (51) has route information (74) to the station (31-54) on the second network (21,22,23,24,25), performing the following substeps:

(b1) adding route information (74) to the first data frame (81) to create a first modified data frame, and (b2) sending the first modified data frame out on the second network (21,22,23,24,25); and, (c) when the first destination address (72) addresses a station (31-54) on the second network (21,22,23,24,25) and the bridge (51) does not have route information (74) to the station (31-54) on the second network (21,22,23,24,25), initiating a route discovery process to discover a route to the station (31-54) on the second network (21,22,23,24,25).

13. A method as in claim 12 additionally comprising the steps of:

(d) receiving a second data frame (71) from the second network (21,22,23,24,25), the second data frame (71) having second routing information (74) and a source address (73);

(e) when the bridge (51) is in the second route information (74), performing the following substeps:

(e1) removing the second route information (74) from the second data frame (71) to create a second modified data frame, and (e2) sending the second modified data frame out on the first network (61), and (e3) when the source address (73) is not in the address table (14,140,141) recording in a memory the route information (74) derived from the second route information (74) in the second data frame (71).

* * * * *